United States Patent
Lanning et al.

(10) Patent No.: US 9,293,796 B2
(45) Date of Patent: Mar. 22, 2016

(54) METAL-AIR BATTERY WITH DUAL ELECTRODE ANODE

(71) Applicant: ITN Energy Systems, Inc., Littleton, CO (US)

(72) Inventors: Bruce R. Lanning, Littleton, CO (US); Andrew Colclasure, Littleton, CO (US)

(73) Assignee: ITN Energy Systems, Inc., Littleton, CO (US)

( * ) Notice: Subject to any disclaimer, the term of this patent is extended or adjusted under 35 U.S.C. 154(b) by 325 days.

(21) Appl. No.: 13/717,215

(22) Filed: Dec. 17, 2012

(65) Prior Publication Data

US 2013/0157152 A1 Jun. 20, 2013

Related U.S. Application Data

(60) Provisional application No. 61/576,234, filed on Dec. 15, 2011.

(51) Int. Cl.
| | |
|---|---|
| *H01M 12/08* | (2006.01) |
| *H01M 4/13* | (2010.01) |
| *B82Y 30/00* | (2011.01) |
| *H01M 4/86* | (2006.01) |

(52) U.S. Cl.
CPC .............. *H01M 12/08* (2013.01); *H01M 4/13* (2013.01); *B82Y 30/00* (2013.01); *H01M 4/8605* (2013.01); *Y02E 60/122* (2013.01)

(58) Field of Classification Search
CPC ................................ H01M 12/08; H01M 4/13
USPC .................................................. 429/402–407
See application file for complete search history.

(56) References Cited

U.S. PATENT DOCUMENTS

| | | | |
|---|---|---|---|
| 6,139,987 A | 10/2000 | Koo et al. | |
| 6,392,387 B1 | 5/2002 | Sage et al. | |
| 6,515,787 B1 | 2/2003 | Westfall et al. | |
| 6,753,108 B1 | 6/2004 | Hampden-Smith et al. | |
| 6,822,778 B2 | 11/2004 | Westfall et al. | |
| 6,856,444 B2 | 2/2005 | Ingalls et al. | |
| 6,967,183 B2 | 11/2005 | Hampden-Smith et al. | |
| 7,009,750 B1 | 3/2006 | Westfall et al. | |
| 7,087,341 B2 | 8/2006 | Hampden-Smith et al. | |
| 7,126,091 B1 | 10/2006 | Westfall et al. | |
| 7,133,181 B2 | 11/2006 | Greer | |

(Continued)

OTHER PUBLICATIONS

U.S. Appl. No. 13/758,468, Notice of Allowance mailed Jun. 9, 2014, 9 pgs.

(Continued)

*Primary Examiner* — Sean P Cullen
(74) *Attorney, Agent, or Firm* — George C. Lewis; Merchant & Gould P.C.

(57) ABSTRACT

This disclosure describes metal air battery devices with an anode structure having a plurality of electrodes. An anode is disclosed having a metal source as well as a current collector that together function as an active, reversible, working anode. The source is used for metal-ions that are stripped and stored in the current collector. At this point the current collector contains the metal-ions to be propagated through the rest of the device. Metal-ions may be stripped from and deposited on the current collector, while metal-ions may only be stripped from the source. Upon use of the device metal-ions may be lost to the system for a variety of reasons. To counteract the loss of metal-ions, the current collector is replenished of metal-ions from the source.

14 Claims, 3 Drawing Sheets

(56) References Cited

U.S. PATENT DOCUMENTS

| | | |
|---|---|---|
| 7,145,709 B1 | 12/2006 | Westfall et al. |
| 7,215,457 B1 | 5/2007 | Westfall et al. |
| 7,265,890 B1 | 9/2007 | Demiryont |
| 7,265,891 B1 | 9/2007 | Demiryont |
| 7,277,215 B2 | 10/2007 | Greer |
| 7,362,490 B2 | 4/2008 | Park |
| 7,372,610 B2 | 5/2008 | Burdis et al. |
| 7,531,239 B2 | 5/2009 | Demiryont |
| 7,586,667 B2 | 9/2009 | Demiryont |
| 7,593,154 B2 | 9/2009 | Burdis et al. |
| 7,619,804 B1 | 11/2009 | Demiryont |
| 7,666,233 B2 | 2/2010 | Visco et al. |
| 7,704,555 B2 | 4/2010 | Demiryont |
| 7,830,585 B2 | 11/2010 | Widjaja et al. |
| 8,048,571 B2 | 11/2011 | Visco et al. |
| 8,202,649 B2 | 6/2012 | Visco et al. |
| 2003/0049517 A1 | 3/2003 | Hampden-Smith et al. |
| 2004/0067417 A1 | 4/2004 | Oosawa et al. |
| 2004/0185336 A1 | 9/2004 | Ito et al. |
| 2006/0209383 A1 | 9/2006 | Burdis et al. |
| 2007/0012244 A1 | 1/2007 | Klaassen |
| 2007/0051620 A1* | 3/2007 | Visco et al. .................. 204/280 |
| 2007/0103612 A1 | 5/2007 | Lumpkin |
| 2009/0159582 A1 | 6/2009 | Chami et al. |
| 2010/0086851 A1 | 4/2010 | Wang et al. |
| 2010/0227214 A1 | 9/2010 | Krasnov et al. |
| 2011/0117417 A1 | 5/2011 | Pitts |
| 2011/0267674 A1 | 11/2011 | Wang et al. |
| 2012/0100440 A1* | 4/2012 | Narula et al. .................. 429/405 |
| 2013/0078535 A1 | 3/2013 | Aizawa |
| 2013/0101751 A1 | 4/2013 | Berland et al. |
| 2013/0154113 A1 | 6/2013 | Frey |
| 2013/0171527 A1 | 7/2013 | Lanning et al. |
| 2013/0201545 A1 | 8/2013 | Frey et al. |
| 2013/0224590 A1* | 8/2013 | Divigalpitiya ................ 429/211 |
| 2014/0227609 A1 | 8/2014 | Frey et al. |

OTHER PUBLICATIONS

Electric Power Research Institute, Development of Flexible Electrochromic Films, 1018525, Technical Update, Dec. 2009, EPRI Project Manager: K.R. Amarnath, 2009, 42 pgs.

U.S. Appl. No. 13/731,554, Office Action mailed Aug. 1, 2014, 7 pgs.

PCT International Search Report and Written Opinion in International Application PCT/US2012/056685, mailed Nov. 30, 2012, 8 pgs.

U.S. Appl. No. 13/717,364, Notice of Allowance mailed Sep. 18, 2013, 9 pgs.

U.S. Appl. No. 13/544,391, Office Action mailed Mar. 25, 2015, 14 pgs.

U.S. Appl. No. 13/758,468, Notice of Allowance mailed Dec. 22, 2014, 9 pgs.

U.S. Appl. No. 13/731,554, Amendment and Response filed Oct. 24, 2014, 5 pgs.

U.S. Appl. No. 13/731,554, Notice of Allowance mailed Nov. 7, 2014, 7 pgs.

* cited by examiner

METAL-AIR BATTERY WITH DUAL ELECTRODE ANODE

RELATED APPLICATIONS

This application claims the benefit of U.S. Provisional Application No. 61/576,234, filed Dec. 15, 2011, which application is hereby incorporated by reference.

INTRODUCTION

Metal-air batteries, with their open cell structure, have the potential to achieve theoretical energy densities on the order of hydrocarbon fuels (11 kWh/kg for organic electrolyte; $Li_2O_2$ discharge product and 6 kWh/kg for alkaline electrolyte; LiOH discharge product) to meet electric vehicle and other portable power requirements. Metal-air batteries can be used in a variety of devices, from small batteries used in hearing aids, to batteries used in portable electronic devices such as personal computing devices, phones, or cameras, to large batteries used in electric vehicle propulsion. Despite the desirable energy densities, 'round trip' efficiencies and lifetimes of current rechargeable metal-air battery designs are lower than desired.

Lithium, with an energy density higher than other practical metal candidates, serves as the ideal anode material for the metal-air chemistry. While having a higher energy density than other practical metal candidates, managing reactivity and/or stability of lithium metal and its reaction products in combination with oxygen are critical to a successful lithium-air battery design. Further, there are common technical challenges associated with insoluble lithium reaction product formation, efficiency of the bi-functional oxygen electrode (high polarization resistance), management of water and impurities, such as $CO_2$, and stability and/or reactivity and reversibility of the lithium metal anode and electrolyte.

It is with respect to these and other considerations that the embodiments disclosed herein have been made. Also, although relatively specific problems have been discussed, it should be understood that the embodiments should not be limited to solving the specific problems identified.

Metal Aid Battery with Dual Electrode Anode

This disclosure describes metal air battery devices with an anode structure having a plurality of electrodes. An anode is disclosed having a metal source as well as a current collector that together function as an active, reversible, working anode. The source is used for metal-ions that are stripped and stored in the current collector. At this point the current collector contains the metal-ions to be propagated through the rest of the device. Metal-ions may be stripped from and deposited on the current collector, while metal-ions may only be stripped from the source. Upon use of the device metal-ions may be lost to the system for a variety of reasons. To counteract the loss of metal-ions, the current collector is replenished of metal-ions from the source.

In part, this disclosure describes a battery. The battery includes:

a) an anode having a metal source containing a plurality of metal-ions, a first metal-ion conducting layer in contact with the metal source, a metal current collector in contact with the first metal-ion conducting layer, a second metal-ion conducting layer in contact with the metal current collector;

b) an electrolyte in contact with the second metal-ion conducting layer; and c) a cathode in contact with the electrolyte.

Yet another aspect of this disclosure describes a metal-air battery anode that includes: a lithium source; a first LiPON layer electrically connected with the lithium source; a nanoporous nickel current collector electrically connected with the first LiPON layer; and a second LiPON layer electrically connected with the nanoporous nickel current collector.

The disclosure further describes a battery including:

a) an anode having a metal layer containing a plurality of metal-ions, a first metal-ion conducting layer, a current collector, and a second metal-ion conducting layer;

b) an electrolyte; and c) a cathode.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. The following detailed description is, therefore, not to be taken in a limiting sense.

Embodiments are directed to a Metal-Air Battery with Dual Electrode Anode (hereinafter the "Device"). The device is designed to address the reactivity and stability issues associated with depositing and stripping lithium metal as well as preventing the buildup of unwanted films and unnecessary contact resistance, shorting, or loss of contact area. Metal-air batteries can be one of at least four different metal-air battery architectures and are often categorized according to the type of electrolyte such as but not limited to lithium salt in aprotic organic solvent (similar to lithium ion), aqueous, hybrid or organic/aqueous, and all solid state or hydrophobic ionic liquid.

Figure 1:
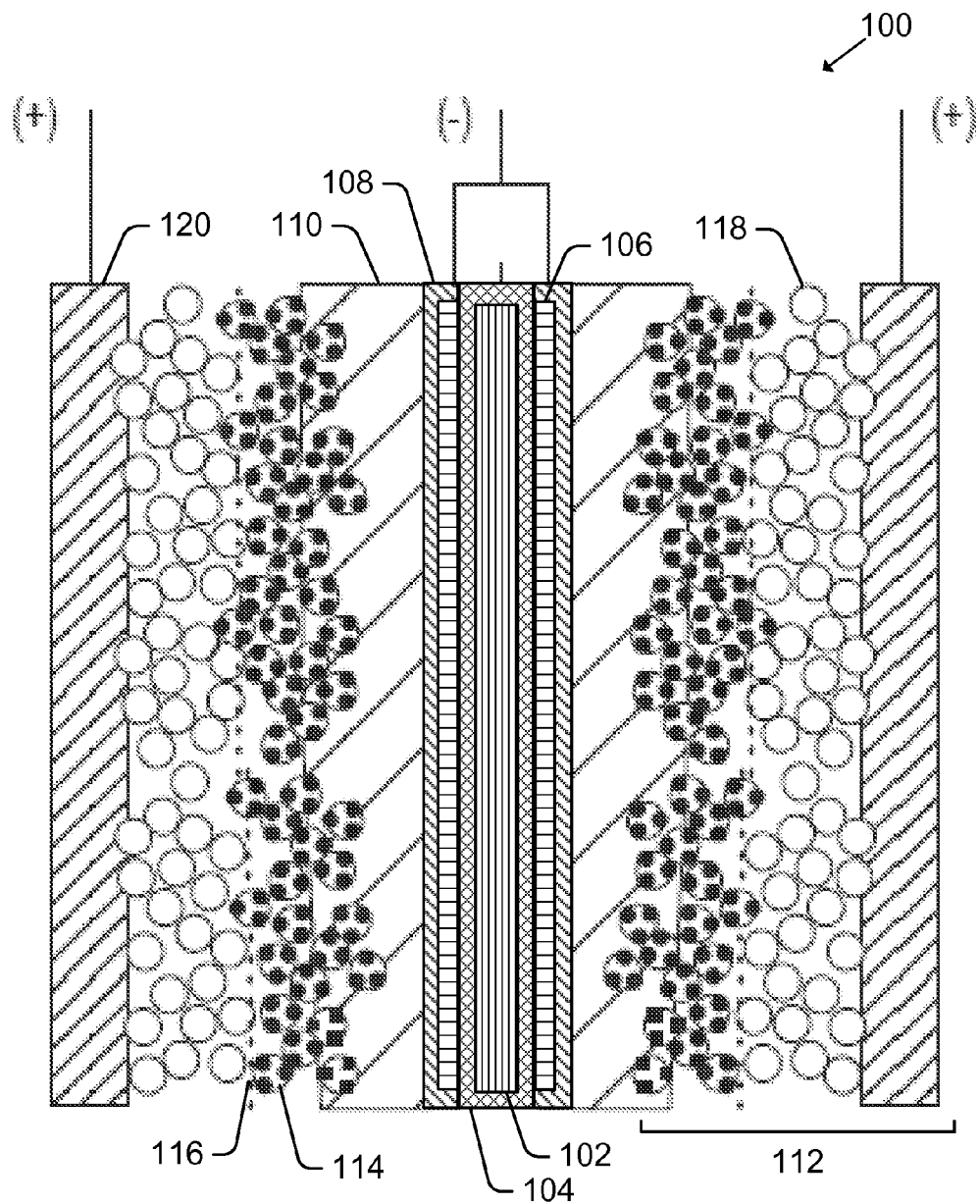
FIG. 1 illustrates an embodiment of a metal-air battery.

To address the reactivity and/or stability issues associated with depositing and stripping lithium metal, an embodiment with a dual electrode anode is used. In most lithium air batteries, the anode is simply lithium metal. In Lithium-air batteries, lithium metal is either in contact with an organic liquid electrolyte or a solid ceramic Li-ion conductive layer, such as the protected lithium metal electrode from PolyPlus. As disclosed herein, an embodiment of a "dual electrode" anode consists of a pure lithium metal source layer (counter electrode) surrounded by thin film lithium ion conducting lithium phosphate oxynitride layers in conjunction with nano-engineered, bipolar current collectors to serve as the active, reversible working anodes. In other words lithium is plated from the pure metal source to the nanostructured current collector to not only replenish, but establish a reversible, lithium anode structure. Thus, the full lithium air battery cell will consist of three electrodes (air cathode, reversible working anode, and lithium source) as shown in FIG. 1. The air cathode may consist of a gas diffusion membrane, gas selective membrane, and catalytically active layer.

FIG. 1 illustrates an embodiment of a metal-air battery 100. In this embodiment a lithium source material 102 is used to provide metal-ions, in this embodiment lithium-ions, and electrons through oxidation. Lithium has as high specific capacity (3840 mAhg) compared with other metal-air battery materials making it a suitable choice for source material 102, although many other metals or compounds may be used or preferred depending on the specifics of the battery, such as but not limited to zinc, aluminum, magnesium, molybdenum, iron, nickel, carbon, graphite, graphene, tin, and any combination or variation thereof. During operation electrochemical potential oxidizes the source material 102 resulting in the production of ions and electrons. The resulting electrons flow through the external circuit to do electric work, while the ions move through the subsequent battery layers towards a cathode. In an embodiment the source material 102 is in electrical contact with, and in some cases surrounded by, a first metal-ion conducting layer 104. In an embodiment the first conducting layer 104 is a ceramic, glass, lithium phosphate oxynitride (LiPON), or other material suitable for conducting the metal-ions produced by the source material 102. In an embodiment, the source material 102 is used to strip metal-ions from, but not used to deposit onto, in other words the metal-ions only flow in one direction. Therefore the source material 102 functions as a source for metal-ions, but is not the active, reversible, working anode. Since metal-ions are only stripped from the source material 102 various problems that arise during cycling are avoided. The first conducting layer 104 allows the flow of metal-ions from the source material 102 while also physically isolating the source material 102 from layers that could be detrimental to the long term operation of the battery 100.

In an embodiment, the battery 100 further includes a current collector 106 in contact with the first conducting layer 104. The current collector 106 during operation collects metal-ions through the first conducting layer 104 from the source material 102, as well as provides the metal-ions to subsequent battery layers.

In an embodiment the current collector 106 during operation functions as the active, reversible, working anode. The current collector 106 is often metal and may be a variety of materials such as but not limited to: carbon, graphite, graphene, nickel, zinc, copper, gold, and any combination or variation thereof. In an embodiment, the current collector 106 is nanoporous, or an organic or inorganic framework that supports a porous structure tens to hundreds of microns thick with pores roughly between $1\times10^{-7}$ and $0.2\times10^{-9}$ m. The current collector may be in contact with a second metal-ion conducting layer 108. In an embodiment the second conducting layer 108 is a ceramic, glass, LiPON, lithium aluminum germanium phosphate (LAGP), lithium aluminum titanium phosphate (LATP), lithium lanthanum titinate (LLT) or other material suitable for conducting the metal-ions stored in the current collector 106. The second conducting layer 108 allows the flow of metal-ions from the current collector 106 and may also physically isolate the current collector 106 from layers that could be detrimental to the long term operation of the battery 100. In an embodiment, the first conducting layer 104 and the second conducting layer 108 are one layer, with the current collector 106 embedded within the one layer.

In an embodiment, the battery 100 further includes an electrolyte 110 in contact with the second conducting layer 108. The electrolyte 110 may vary depending on the specific design of the metal-air battery. In an embodiment of an aprotic battery design, the electrolyte 110 is a liquid organic electrolyte, or any organic capable of solvating the metal-ions into salts such as but not limited to dimethyl sulfoxide, and typically consist of carbonates, ethers, and esters. an embodiment of an aqueous battery design, the electrolyte 110 is an aqueous electrolyte, such as a combination of salts dissolved in water. In an embodiment of a mixed aqueous and aprotic battery design, the electrolyte 110 is a combination of the above mentioned aprotic and aqueous electrolytes often with a metal-ion conducting membrane separating the two electrolytes. In an embodiment of a solid state battery design, the electrolyte 110 is a solid state electrolyte such as but not limited to ceramic, glass, polymer, polymer-ceramic composite, or glass-ceramic composite.

In an embodiment, the battery 100 further includes a cathode 112 in contact with the electrolyte 110. At the cathode 112 reduction occurs when the metal-ions are combined with oxygen. The cathode 112 may be a variety of materials, but often consists of carbon. Further, in an embodiment, the cathode 112 consists of additional layers, such as but not limited to a catalytically active layer 114, a gas selection membrane 116, a gas diffusion membrane 118, and a cathode plate 120. The catalytically active layer 114 may include a metal catalyst to enhance the oxygen reduction kinetics and increase the specific capacity of the cathode 112. Metals such as but not limited to manganese, cobalt, ruthenium, platinum, silver, and any combination thereof may be used as catalysts. The cathode 112 may further include a gas selection membrane 116, often made using a fluoropolymer, used to separate oxidation products from coming into contact with the cathode plate 120. Also, in an embodiment the cathode 112 includes a gas diffusion membrane 118, often an open carbon structure, which provides low resistance pathways for oxygen to diffuse into the catalytically active layer 114 for reduction. Lastly, a cathode plate 120 is present in the cathode 112. This cathode plate 120 serves as a point of contact for the cathode 112 and is often porous carbon.

Figure 2:
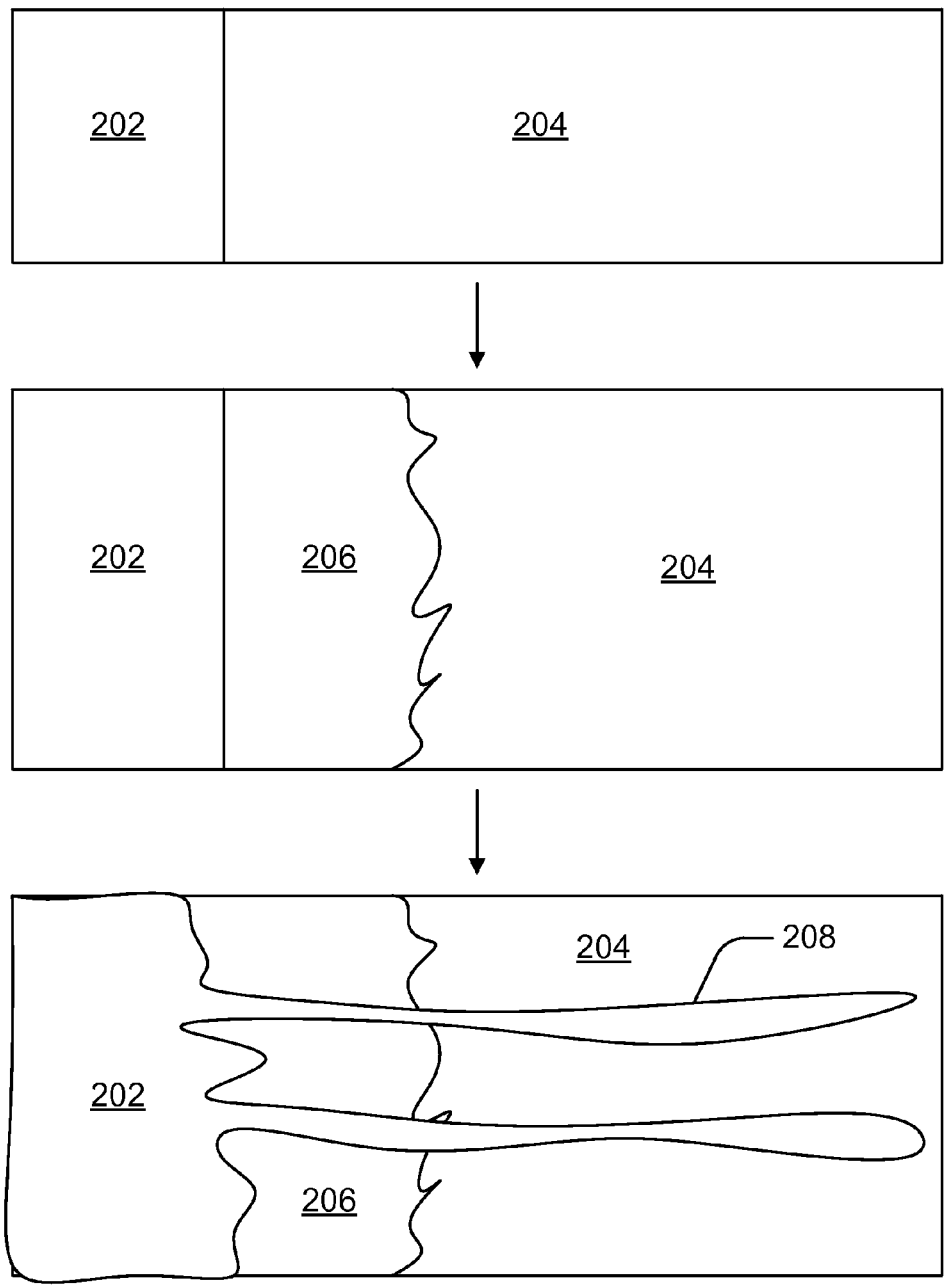
FIG. 2 illustrates issues associated with the use of a liquid organic electrolyte in prior art.

FIG. 2 illustrates issues associated with the use of a liquid organic electrolyte in prior art. In this embodiment, lithium metal 202 is in contact with a liquid organic electrolyte 204. For an anode consisting of lithium metal 202 in contact with an organic liquid electrolyte 204, the anode lifetime is severely limited (<100 cycles) and is the reason rechargeable lithium batteries with organic liquid electrolytes were never heavily commercialized. The organic liquid electrolyte 204 is thermodynamically unstable at the anode operating potentials, thus, the organic liquid electrolyte 204 spontaneously reacts with the lithium metal 202 to form a passivating film called the solid electrolyte interface 206 (SEI). During cycling, lithium ions must be conducted through the SEI film 206 and this process leads to a voltage loss (i.e., lowers performance) and irreversible capacity loss as lithium is chemically bound in the SEI. Also, during cycling the lithium metal's 202 volume expands and contracts considerably as lithium is deposited and stripped. These extreme volume changes inevitably lead to cracks within the SEI layer 206 and re-expose lithium metal 202 to the organic liquid electrolyte 204. The 'fresh' lithium further reacts with the organic liquid electrolyte 204 and the SEI layer 206 grows leading to an increase in resistive losses and capacity losses. Due to variations within the SEI layer 206, the local current density along the lithium metal 202 varies considerably (i.e., lithium is unevenly deposited and or stripped along the lithium surface). Thus, the lithium surface roughens developing pits and bumps. The bumps extend with continued cycling and become whiskers called dendrites 208. Eventually, the dendrites grow long enough to come in contact with the cathode and short the cell (i.e., they lead to cell failure).

The disclosed metal air battery with dual electrode anode, an embodiment of which is illustrated in FIG. 1, eliminates the problems illustrated in FIG. 2 because the metal source is not in direct contact with the electrolyte, preventing the capacitive and resistive losses due to the growth of an SEI film. Further, the metal source is in contact with a solid layer, such as but not limited to a ceramic layer, preventing the growth of dendrites, and therefore preventing shorting the battery due to the dendrites contacting the cathode.

Figure 3:
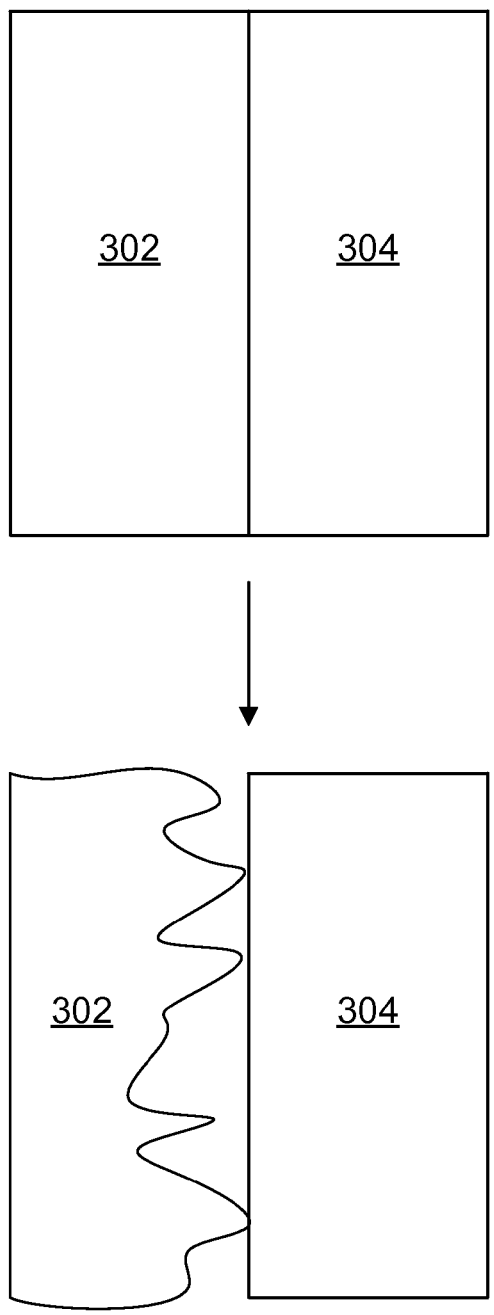
FIG. 3 illustrates issues associated with the use of a metal-ion conductive layer in contact with a metal source in prior art.

FIG. 3 illustrates issues associated with the use of a metal-ion conductive layer in contact with a metal source in prior art. For an embodiment of an anode consisting of lithium metal 302 in contact with a solid ceramic Li-ion conductive layer 304 (protected lithium metal electrode—PLE), the problems mentioned above, in FIG. 2, are avoided. The ceramic layer 304 is thermodynamically stable in contact with lithium metal 302 at the anode operating potentials and an SEI layer is not formed. Also, the solid ceramic 304 prevents shorting of the cell. However, the large and repeated volume changes from depositing stripping lithium onto a metal lithium surface eventually leads to performance degradation and capacity loss. Initially, the lithium metal 302 is well bonded to the ceramic surface 304. However, due to lithium volume changes from cycling, some contact area between the metal lithium 302 and ceramic layer 304 is lost. At these points, lithium can't be cycled. This process leads to roughening of the lithium metal 302 from uneven local current densities, which further accelerates the loss of contact area. As contact area is lost, cell performance and capacity decline. Eventually, the roughening of the metal surface leads to failure of the cell as there is a complete loss of contact between the lithium metal 302 and ceramic layer 304.

The disclosed metal air battery with dual electrode anode, an embodiment of which is illustrated in FIG. 1, eliminates the problems illustrated in FIG. 3 because ions are only stripped from the metal source and not deposited. This reduces the expansion and contraction of the metal source, and therefore maintains contact area with the first metal-ion conducting layer.

For the same reasons as the PLE (lithium metal in contact with ceramic layer) discussed above in FIG. 3, the disclosed dual electrode anode, an embodiment of which is illustrated in FIG. 1, prevents shorting from lithium dendrite growth and irreversible capacity loss and performance loss from continual SEI growth and breakdown. Furthermore, unlike the PLE, the disclosed dual electrode anode does not suffer from the loss of contact area associated with the large and repeated volume changes with cycling lithium onto a lithium metal surface. In an embodiment of a dual electrode anode architecture, lithium is reversibly deposited/stripped onto the numerous inner surfaces of a nanostructured porous metal (nickel, copper, etc.) current collector. The volume of the nanostructured metal remains relatively constant during cycling and good ionic contact is maintained between the working anode, or nanostructured porous metal, and ceramic layer. In an embodiment, the nanostructured anode may have a thickness around 10 microns, at this length scale lithium can be electrically driven in and out of the porous scaffold (i.e., the scaffold does not need to contain an organic electrolyte for Li-ion conduction).

In any configuration, lithium is consumed due to side reactions (SEI growth, loss of contact area, oxide formation, consumed within the cathode, etc.). Thus, in the prior art anode configurations, the capacity of the anode within the lithium air battery will fade as lithium is consumed. With the disclosed dual electrode anode, and embodiment of which is illustrated in FIG. 1, lithium can be moved from the counter electrode (lithium metal or metal source) into the working anode (nanostructured porous current collector) by lowering the electric potential of the working anode relative to the counter electrode. Thus, the capacity of the anode can be maintained at a relatively constant level. Also, because a relatively small amount of lithium is only periodically stripped from the lithium metal, the metal source is not subject to large rapid volume changes and does not suffer from a loss of contact area. The disclosed dual electrode anode may increase the overall weight of the anode and cell complexity. However, the increased anode weight should not lower the energy density of the cell considerably because the anode is usually much lighter compared to the air cathode. The disclosed dual electrode anode can interface with an organic liquid electrolyte (aprotic electrolyte), aqueous liquid electrolyte, mixed aprotic/aqueous electrolyte, or solid-state electrolyte.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

We claim:

1. A battery comprising:
   a current collector functioning as an anode;
   a metal source containing a plurality of metal-ions, wherein the metal source is electrically coupled to the current collector, wherein the metal source is surrounded by a first metal-ion conducting layer, the first metal-ion conducting layer providing a pathway for at least a portion of the plurality of metal-ions to travel to the current collector functioning as the anode;

wherein the first metal-ion conducting layer is in contact with the current collector;
a second metal-ion conducting layer in contact with the current collector;
an electrolyte in contact with the second metal-ion conducting layer; and
a cathode in contact with the electrolyte.

2. The battery of claim 1, wherein the metal source further comprises:
at least one of lithium, zinc, aluminum, magnesium, molybdenum, iron, nickel, carbon, graphite, graphene, and tin.

3. The battery of claim 1, wherein the plurality of metal-ions comprise:
at least one of lithium-ions, zinc-ions, aluminum-ions, magnesium-ions, molybdenum-ions, iron-ions, nickel-ions, and tin-ions.

4. The battery of claim 1, wherein the first metal-ion conducting layer comprises:
at least one of ceramic, glass, and LiPON.

5. The battery of claim 1, wherein the second metal-ion conducting layer comprises:
at least one of ceramic, glass, LiPON, LAGP, LATP, and LLT.

6. The battery of claim 1, wherein the current collector comprises:
at least one of nickel, zinc, molybdenum, carbon, graphite, graphene, copper, and gold.

7. The battery of claim 6, wherein the current collector is nanoporous.

8. The battery of claim 1, wherein the electrolyte comprises:
at least one of liquid organic electrolyte, aqueous electrolyte, and solid-state electrolyte.

9. The battery of claim 1, wherein the battery is a solid state battery.

10. The battery of claim1, wherein the cathode comprises a gas selective membrane.

11. The battery of claim 1, wherein the cathode comprises a gas diffusion membrane.

12. The battery of claim 1, wherein the cathode comprises:
at least one of carbon, manganese, cobalt, ruthenium, platinum, silver, and fluoropolymer.

13. The battery of claim 1, wherein the cathode comprises a catalytically active layer.

14. The battery of claim 13, wherein the catalytically active layer comprises:
at least one carbon, manganese, cobalt, ruthenium, platinum, and silver.

* * * * *